US006744462B2

(12) United States Patent
Gutta et al.

(10) Patent No.: US 6,744,462 B2
(45) Date of Patent: Jun. 1, 2004

(54) APPARATUS AND METHODS FOR RESOLUTION OF ENTRY/EXIT CONFLICTS FOR SECURITY MONITORING SYSTEMS

(75) Inventors: Srinivas Gutta, Buchanan, NY (US); Damian M. Lyons, Putnam Valley, NY (US); Antonio Colmenarez, Jr., Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

(21) Appl. No.: 09/734,820

(22) Filed: Dec. 12, 2000

(65) Prior Publication Data

US 2002/0071033 A1 Jun. 13, 2002

(51) Int. Cl.$^7$ ................................. H04N 7/18
(52) U.S. Cl. ........................................ 348/143
(58) Field of Search ............................... 348/143, 152, 348/156; 382/118, 156, 195, 224; H04N 7/18

(56) References Cited

U.S. PATENT DOCUMENTS

| | | | | |
|---|---|---|---|---|
| 5,097,328 A | * | 3/1992 | Boyette | 348/150 |
| 5,602,933 A | * | 2/1997 | Blackwell et al. | 382/116 |
| 5,657,076 A | | 8/1997 | Tapp | |
| 5,704,008 A | * | 12/1997 | Duvall, Jr. | 704/273 |
| 5,831,669 A | | 11/1998 | Adrain | |
| 5,982,418 A | | 11/1999 | Ely | |
| 6,069,653 A | | 5/2000 | Hudson | |
| 6,069,655 A | | 5/2000 | Seeley et al. | |
| 6,111,517 A | * | 8/2000 | Atick et al. | 340/5.83 |
| 6,119,096 A | * | 9/2000 | Mann et al. | 705/5 |
| 6,128,397 A | * | 10/2000 | Baluja et al. | 382/118 |
| 6,166,763 A | * | 12/2000 | Rhodes et al. | 348/143 |
| 6,282,649 B1 | * | 8/2001 | Lambert et al. | 713/167 |
| 6,570,608 B1 | * | 5/2003 | Tserng | 348/143 |

FOREIGN PATENT DOCUMENTS

| | | | |
|---|---|---|---|
| EP | 0962894 A2 | 8/1999 | ............ G07C/9/00 |
| GB | 2223614 A | 4/1990 | |
| GB | 2343945 A | 5/2000 | |
| JP | 11-328405 | 11/1999 | |

OTHER PUBLICATIONS

Rowley, H.A., et al., "Human Face Detection in Visual Scenes", advances in Neural Information Processing Systems 8, Proceedings of the 1995 Conference, pp. 875–881, 1996.

Rowley, H.A., et al., "Rotation Invariant Neural Network–Based Face Detection", Proceedings, 1988 IEEE Computer Society Conference on Computer Vision and Pattern Recognition, pp. 38–44, 1998.

Raja, Y., et al., "Segmentation and Tracking Using Colour Mixture Models", Computer Vision—ACCV '98, Third Asian Conference on Computer Vision, Hong Kong, China, Jan. 1998, Proceedings, vol. 1.

(List continued on next page.)

Primary Examiner—Nhon Diep
(74) Attorney, Agent, or Firm—Gregory L. Thorne

(57) ABSTRACT

A security monitoring system including; an exit and entrance camera located at the exit and entrance of a structure; a detector for detecting the exit or entry of an individual; an image recording system for stroring images from the exit and entrance cameras; and a computer vision system for analyzing the stored images using a predetermined criteria to determine if the exiting and entering individuals are the same. In a preferred implementation, the system also includes a database for storing face image data for each authorized individual of the structure; and a face recognition system for comparing the stored images from the entry and entrance camera with the stored image data in the database and for determining if the exiting and entering individual is one of the authorized individuals.

20 Claims, 3 Drawing Sheets

OTHER PUBLICATIONS

Lee, C.H., et al., "Automatic Human Face Location In A Complex Background Using Motion And Color Information", Pattern Recognition, vol. 29, No. 11, pp. 1887–1889, 1996.

Gutta, S., et al., "Face Surveillance", Sixth International Conference on Computer Vision, The Institute of Electrical and Electronics Engineers, Inc., pp. 646–651.

Stauffer, C., "Automatic hierarchical classification using time–based co–occurrence", IEEE Computer Society Technical Committee on Pattern Analysis and Machine Intelligence, vol. 2, pp. 333–339.

Grimson, W.E.L., et al., "Using adaptive tracking to classify and monitor activities in a site".

* cited by examiner

APPARATUS AND METHODS FOR RESOLUTION OF ENTRY/EXIT CONFLICTS FOR SECURITY MONITORING SYSTEMS

BACKGROUND OF THE INVENTION

1. Field of the Invention

The present invention relates generally to security monitoring systems and, more particularly, to a security monitoring system having a computer vision system for recognizing individuals entering and leaving a structure to resolve entry/exit conflicts.

2. Prior Art

Security monitoring systems of the prior art, particularly residential security systems, utilize a box that monitors contact sensors for doors and windows and one or more infra-red sensors for area monitoring. When a contact is triggered or an infra-red sensor triggers, an alarm is sounded and a signal is sent via a data link such as a phone line to a central monitoring site. The central monitoring site typically initiates a set of phone calls, to the homeowner, to work, and/or to a designated neighbor to determine if the alarm signal was due to an unauthorized intruder or just to an accidental triggering by a family member or other authorized occupant of the structure.

If the alarm signal cannot be resolved by the phone calls, it is passed to the local police department. 95% of the calls passed to the police department turn out to be "false alarms" in the sense that they were not due to an unauthorized intruder.

Significant portions of "false alarms" are caused by what is referred to as entry/exit conflicts. For instance, in the situation of a residential alarm system, the homeowner or other authorized occupant of a residence often arms the security system while leaving the residence and shortly thereafter realizes that they have forgotten something in the residence. As they return to the residence, they enter without disarming the system thereby causing an alarm to be sounded and/or an alarm signal to be sent to a central monitoring site. Similarly, the homeowner may arm the security system and remain inside the residence, such as during the night and may thereafter leave to get something outside the residence, i.e., the morning paper, thereby triggering a false alarm.

In view of the prior art, there is a need for a security monitoring system, which resolves these and other types of entry/exit conflicts.

SUMMARY OF THE INVENTION

Therefore it is an object of the present invention to provide a security monitoring system, which resolves the entry/exit conflicts of the prior art security monitoring systems.

It is a further object of the present invention to provide a security monitoring system that monitors the entrance and exit of individuals to a structure, records key image data, and matches an exiting individual against an entering individual.

Accordingly, a security monitoring system is provided. The security monitoring system comprises; an exit and entrance camera located at the exit and entrance, respectively of a structure; a detector for detecting the exit or entry of an individual into or from the structure; an image recording system for storing images from the exit and entrance cameras; and a computer vision system for analyzing the stored images transmitted from the image recording system using a predetermined criteria to determine if the exiting and entering individuals are the same. Preferably, the exit and entrance cameras are either video cameras or the images are video images or digital cameras and the images are still images.

The security monitoring system preferably further comprises means for transmitting an alarm signal and/or at least a portion of the stored images to a remote site if the exiting and entering individual is determined not to be the same. Alternatively, the security monitoring system can transmit an alarm signal and/or at least a portion of the stored images if the exiting and entering individual is the same.

In a preferred implementation of the security monitoring system of the present invention, the predetermined criteria used to determine if the exiting and entering individuals are the same comprises matching descriptive features of the entering and exiting individual such as a color, shape, or texture distribution of the stored images.

In yet a more preferred implementation of the security monitoring system of the present invention, the security monitoring system further comprises: a database for storing image data for each authorized individual of the structure; and a recognition system for comparing the stored images from the entry and entrance camera with the stored image data in the database and for determining if the exiting and entering individual is one of the authorized individuals. Preferably, the stored image data in the database are face images and the recognition system is a face recognition system. In the more preferred implementation, the security monitoring system further comprises means for transmitting an alarm signal and/or at least a portion of the stored images to a remote site if the exiting and entering individual is determined not to be the same and the exiting and entering individual is determined not to be one of the authorized individuals.

Also provided is a method for performing security monitoring of a structure. The method comprising the steps of; capturing images at both an exit and entrance of the structure; before or after the capturing step, detecting the exit or entry of an individual into or from the structure; storing the images from the exit and entrance camera; and analyzing the stored images using a predetermined criteria to determine if the exiting and entering individuals are the same.

Preferably, the method further comprises the step of transmitting an alarm signal and/or at least a portion of the stored images to a remote site if the exiting and entering individual is determined not to be the same. Alternatively, the security monitoring system can transmit an alarm signal and/or at least a portion of the stored images if the exiting and entering individual is the same.

In a preferred implementation of the methods of the present invention, the method further comprises the steps of: storing image data for each authorized individual of the structure; and comparing the stored images from the entry and entrance with the stored image data for determining if the exiting and entering individual is one of the authorized individuals. The preferred implementation of the methods of the present invention further comprises the step of transmitting an alarm signal and/or at least a portion of the stored images to a remote site if the exiting and entering individual is determined not to be the same and the exiting and entering individual is determined not to be one of the authorized individuals.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of security monitoring systems, it has been found particularly useful in the environment of residential security monitoring systems. Therefore, without limiting the applicability of the invention to residential security monitoring systems, the invention will be described in such environment.

Figure 1:
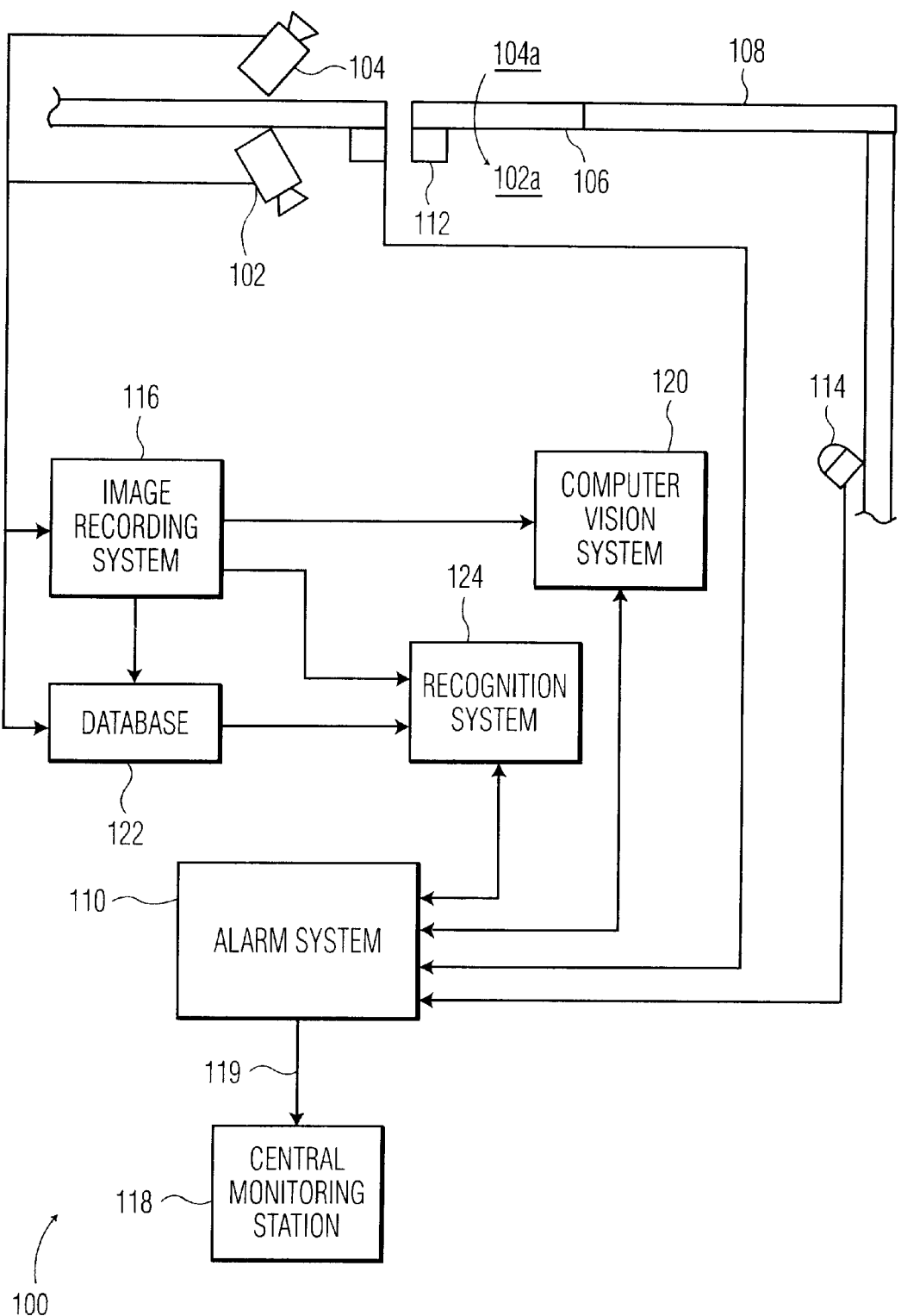
FIG. 1 illustrates a schematical view of the security monitoring system of the present invention.

Referring now to FIG. 1, there is illustrated a security monitoring system of the present invention, generally referred to by reference numeral 100. The security monitoring system 100 includes an exit and entrance camera 102, 104 located at the exit 102a and entrance 104a of a door 106, respectively, of a residential home or a commercial building, generally referred to herein as a structure 108. The door 106 is shown as a typical exterior door by way of example only and not to limit the scope of the invention. Those of skill in the art will recognize that any thing providing an entry or exit into or from a structure can be the subject of the present invention, such as a sliding door, a roll-up door, or a garage door. The exit and entrance cameras 102, 104 are preferably video cameras which supply a sequence of video frames, but can alternatively be digital cameras supplying a sequence of still pictures. Furthermore, the exit and entrance cameras 102, 104 can be static or pan-tilt-zoom (PTZ) types. Both the sequence of video frame and still pictures are generally referred to herein as images or image data. The exit and entrance cameras 102, 104 are shown mounted near the door 106 and facing towards the exit and entrance 102a, 104a, respectively. However, this configuration is illustrated for its simplicity. Preferably, the exit and entrance cameras 102, 104 are mounted in the door 106 as is described in co-pending U.S. patent application Ser. No. 09/734,780 which is incorporated herein by its reference.

The security monitoring system also includes an alarm system 110. The alarm system 110 has a detector for detecting the exit or entry of an unknown individual through the door 106 and into or from the structure 108. Although the unknown individual may turn out to be an authorized individual, at the time of exit or entry he or she has yet to be classified as either authorized or unauthorized. The detector can be any device known in the art for detecting the operation of a door 106, such as a magnetic door contact sensor 112 positioned on the door 106 or an infra-red sensor 114 located near the door 106 of the structure. Alternatively, the detector can be a sensor located on the door-knob of the door 106 or a background change detection system such as is also disclosed in co-pending U.S. patent application Ser. No. 09/734,780. The detector can also detect the act of arming the alarm system, or turning the door-knob or key tumbler on the door 106 or any device which can serve as a detector.

An image recording system 116 stores the images of the unknown individual from the exit and entrance cameras upon the triggering of the detector. That is, if the detector is triggered such that an alarm signal would ordinarily be transmitted to a central monitoring site 118, the image recording system 116 stores the images from the exit and entrance cameras 102, 104. Alternatively, the image recording system 116 can store all of the images in a buffer where new image data overwrites old image data such that a predetermined amount of current image data is always stored and available. It is preferred that the image recording system 116 is a computer or any other processor having a storage device such as a hard drive and an image capture card. However, those skilled in the art will recognize that the image recording system 116 can be of any type known in the art without departing from the scope and spirit of the present invention.

A computer vision system 120 analyzes the stored images of the entering and leaving individuals transmitted from the image recording system 116 using a predetermined criteria to determine if the exiting and entering individuals are the same. Preferably, the computer vision algorithm extracts descriptive features of the entering and leaving individuals. These descriptive features are preferably based on one or a combination of the color, texture, or shape distribution of the images. Preferably, the descriptive features are focused on a particular area of the entering and leaving individuals, such as his or her clothes. The descriptive features of the images of the individuals entering and leaving are extracted and compared. If there is no match between the entering and leaving individuals, an alarm signal is triggered and transmitted to the central monitoring site 118 via a data link 119, such as a telephone line (POTS). Preferably the image data of the entering or leaving individual is also transmitted to the central monitoring site 118. It is preferred that computer vision system 120 is a system such as that disclosed in co-pending U.S. application Ser. No. 09/734,821, which is incorporated herein by its reference. However, those skilled in the art will recognize that the computer vision system 120 can be of any type known in the art without departing from the scope and spirit of the present invention, such as that disclosed in Raja et al., "Segmentation and Tracking Using Colour Mixture Models", $3^{rd}$ Asian Conference on Computer Vision, Vol. 1, pp. 607–614, Hong Kong, China, January 1998, which is also incorporated herein by its reference.

In a preferred implementation of the security monitoring system 100 of the present invention, there is also included a database 122 for storing image data, such as the face, for each authorized individual of the structure. In the case of a residential home, the faces of the people living in the home are recorded, preferably by the exit and entry cameras 102, 104 and stored in the database 122. Where the computer vision system 120 determines that the exiting and entering individuals are not the same, instead of triggering an alarm, the security monitoring system 100 can alternatively utilize a recognition system 124 which compares the stored images of the entering and leaving individuals from the entry and entrance cameras with the stored image data (e.g., faces) of the authorized individuals in the database 122. If there is no match between the stored images of the entering and leaving individuals from the entry and entrance cameras with the stored image data of the authorized individuals in the database 122 then the system proceeds as described above by triggering an alarm signal and/or transmitting image data of the entering or leaving individual to the central monitoring site 118. Face recognition algorithms and systems are well known in the art, such as the one described by S. Gutta et al., *Face Recognition,* Sixth International Conference on Computer Vision, pgs. 646–651, IEEE, Jan. 4–7, 1998, Mumbai, India.

If either the comparison of the entering and leaving individuals from the computer vision system 120 or the comparison of the stored images of the entering and leaving individuals from the entry and entrance camera with the stored image data of the authorized individuals in the database 122 results in a match, the alarm signal is not triggered (i.e., an exit or entry that would ordinarily trigger an alarm is ignored). Alternatively, the alarm signal can be transmitted upon the "unauthorized" exit or entry and an ignore signal can follow if it is determined that the entering and exiting individuals are the same. Furthermore, even if the exiting and entering individuals are determined to be the same, the alarm signal and/or a portion of the image data can be transmitted to the central monitoring site. For instance, if the unknown individual is determined to be the maid, who is authorized to be in the structure, the image data can later support or deny a subsequent allegation that the maid stole property from the structure.

A combination of face as well as descriptive features of the unknown individual can also be used as a way to verify the unknown individual as being authorized. This can be done either sequentially as discussed below or in parallel.

The security monitoring system 100 has been described with reference to FIG. 1 in general terms without reference to a particular entry/exit conflict. Two particular exit/entry conflicts will now be described with reference to FIGS. 2 and 3. However, those skilled in the art will realize that the general description above is intended to cover any such exit/entry conflict and is not therefore limited to any one particular entry/exit conflict or to the entry/exit conflicts described with regard to FIGS. 2 and 3.

Figure 2:
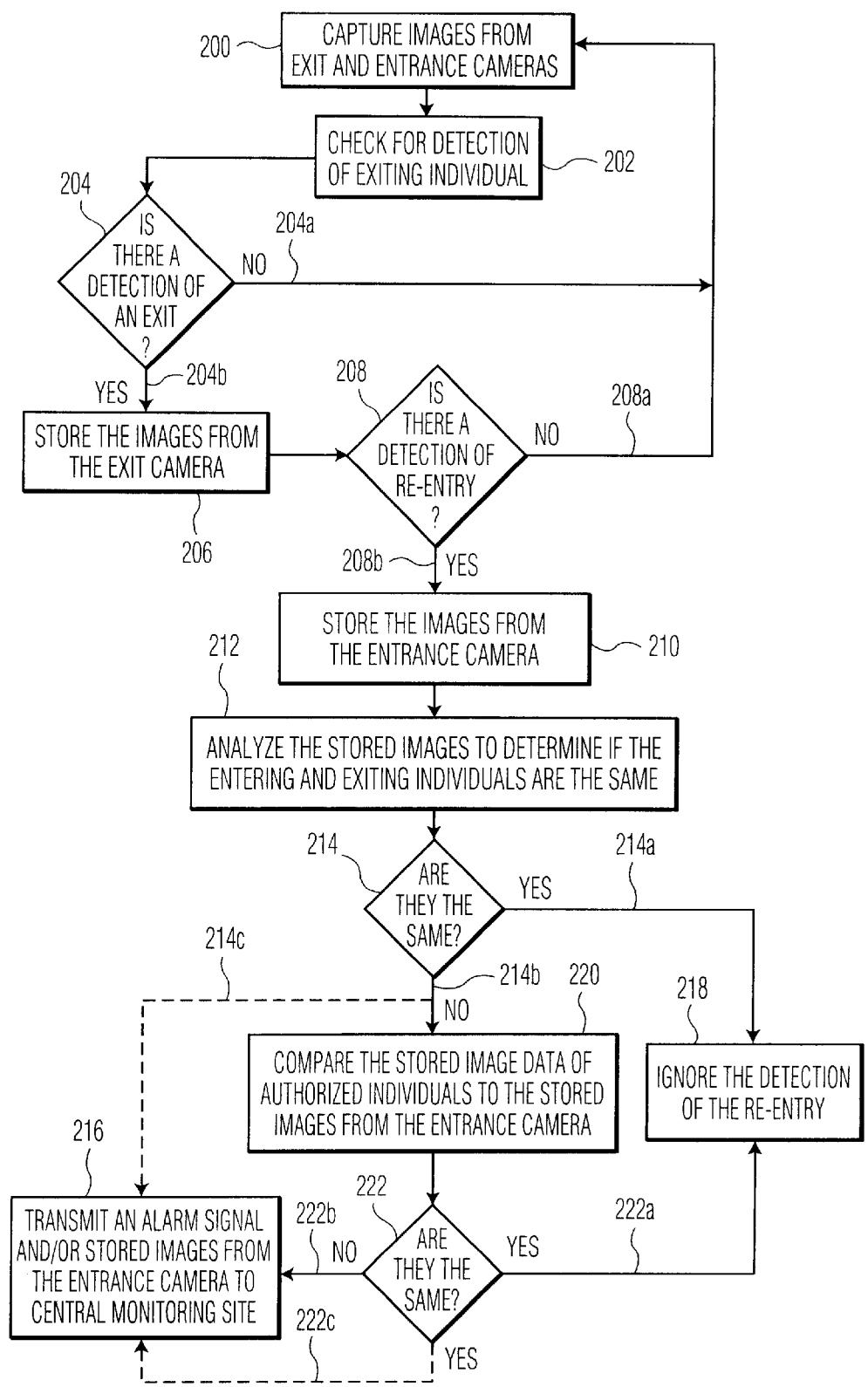
FIG. 2 illustrates a flow chart of a first entry/exit conflict to be resolved by the security monitoring system of FIG. 1.

Referring now to the flowchart of FIG. 2, there is illustrated a method for providing the security monitoring system of the present invention where the alarm system 110 is "armed" and an entrance into the structure 108 will cause the triggering of the alarm and transmission of an alarm signal to the central monitoring site 118. Such is the case where an authorized person "arms" the alarm system 110, exits the structure 108, and returns a short time later without disarming the alarm system 110 because they have forgotten something inside the structure 108.

At step 200, the exit and entrance cameras 102, 104 capture images from the exit and entrance 102a, 104a of the door 106 of the structure 108. Alternatively, the cameras can come on to capture image data upon the occurrence of an event, such as the turning of a door knob or key tumbler on the door 106 or triggering a sensor on or near the door 106 or detecting through background models. At step 202 one or more of the detectors 112, 114 check for the detection of an exiting individual. If there is a detection of an exit (shown schematically as path 204b), the exit camera 102 will store a last predetermined portion of the video frames or still images from a buffer (which may also be database 122) at step 204. Alternatively, the exit camera 102 can capture images and the image recording system 116 store those images upon the detection of an event, such as when the authorized person "arms" the alarm system in which case the exit camera 102 can capture and record the arming of the alarm system. If there is no detection of an exit, the flow chart proceeds along path 204a and the cameras 102, 104 continue to capture images or alternatively return to a dormant state before capturing images upon the occurrence of the event.

The security monitoring system 100 then looks for a re-entry into the structure at step 208. If the alarm system 110 detects a re-entry into the structure within a predetermined time limit (shown schematically as path 208b), the images from the entry camera 104 are stored or taken from the buffer into the image recording device 116 at step 210. If there is no re-entry, the system continues along path 208a to step 200 to capture images from the exit and entrance cameras.

The stored images from the exit and entry cameras 102, 104 are then analyzed by the computer vision system 120 at step 212 to determine if the descriptive features therein match at step 214. If there is a match (i.e., it is determined that the same person who left, later re-entered) the system continues along path 214a and the detection of the re-entry is ignored at step 218. If there is not a match, the system can follow along either path 214c or 214b. If the system follows along path 214c (shown as a dotted line) to step 216, an alarm signal is transmitted preferably along with the stored images from the entrance camera to the central monitoring site 118. However, in case the exiting person re-enters with a different descriptive feature, as is the case where a color distribution is used and the person exits with a jacket and re-enters without it, a further face recognition can be performed at step 220. At step 220, the stored image data, such as the faces of all of the people authorized to have access to the structure, are compared to the stored images from the entrance camera 104. At step 222, it is determined if there is a match. If there is no match, the system proceeds along path 222b to step 216 where an alarm is triggered. If there is a match, the system proceeds along path 222a to step 218 where the detection of the re-entry is ignored or alternatively, along path 222c (shown as a dotted line) where the alarm signal and/or image data can also be transmitted to the central monitoring site as discussed above.

Figure 3:
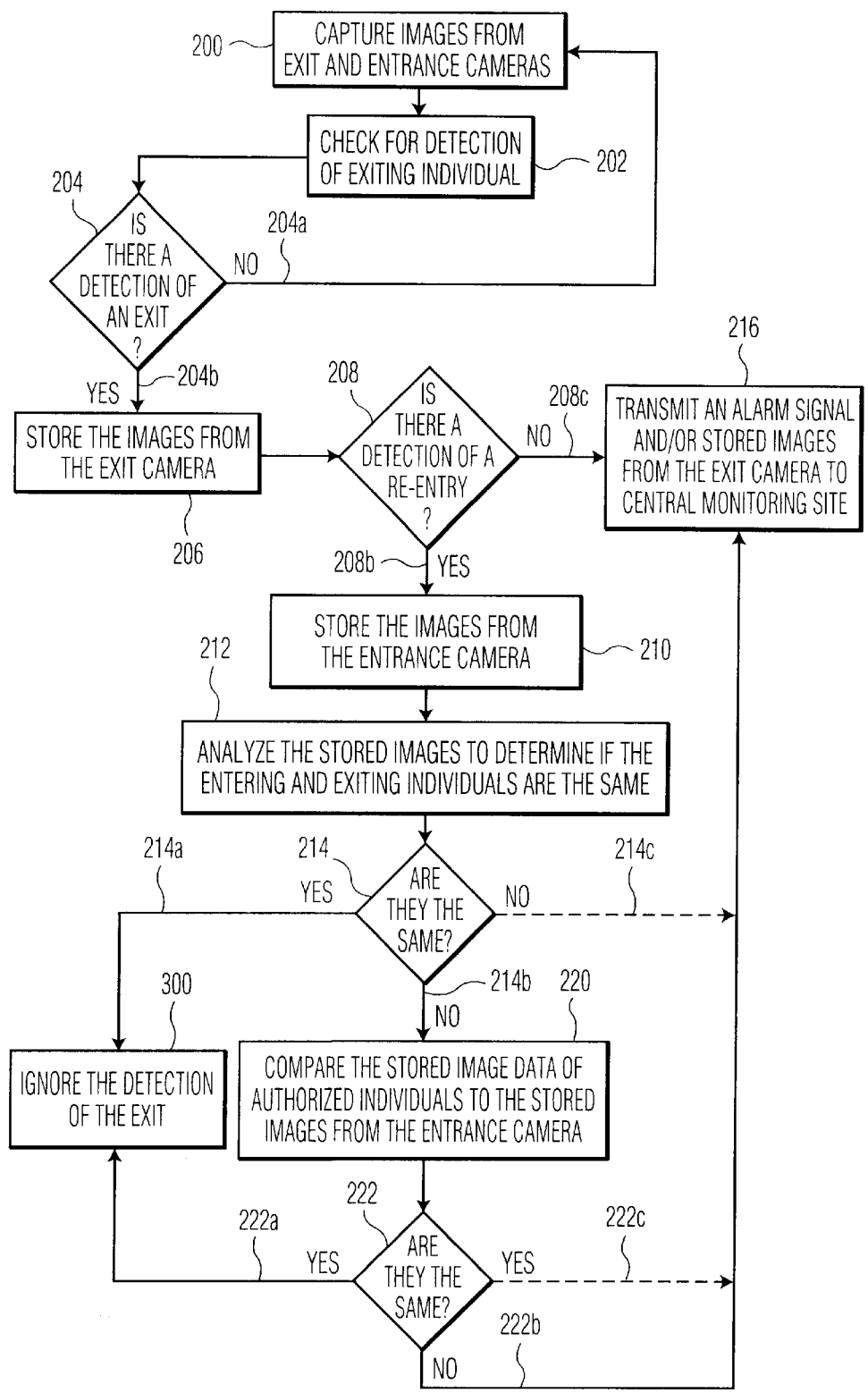
FIG. 3 illustrates a flow chart of a second entry/exit conflict to be resolved by the security monitoring system of FIG. 1.

Referring now to the flowchart of FIG. 3, there is illustrated a method for providing the security monitoring system of the present invention where the alarm system 110 is "armed" and an exit from the structure 108 will cause the triggering of the alarm and transmission of an alarm signal to the central monitoring site 118. Such is the case where an authorized person "arms" the alarm system during the night, exits the structure upon waking without disarming the alarm system, and returns a short time later, perhaps with the morning paper. Similar reference numerals in FIG. 3 denote similar steps as described above with reference to FIG. 2.

At step 200, the exit and entry cameras 102, 104 capture images from the exit and entrance 102a, 104a of the door 106 of the structure 108. At step 202 one or more of the detectors 112, 114 check for the detection of an exiting individual. If there is a detection of an exit (shown schematically as path 204b), the exit camera 102 stores the video frames or still images at step 204. If there is no detection of an exit, the flow chart proceeds along path 204a and continues to capture images or the cameras 102, 104 return to a dormant state until the occurrence of an event.

The security monitoring system 100 then looks for a re-entry into the structure at step 208. If the alarm system 110 detects a re-entry into the structure within a predetermined time limit (shown schematically as path 208b), the last portion of images from the entry camera 104 are stored from a buffer into the image recording device 116 at step 210. If there is no re-entry, the system continues along path 208c to step 216 where an alarm signal is triggered.

The stored images from the exit and entry cameras 102, 104 are then analyzed by the computer vision system 120 at step 212 to determine if the descriptive features therein match at step 214. If there is a match (i.e., it is determined that the same person who left, later re-entered) the system continues along path 214a and the detection of the exit is ignored at step 300. If there is not a match, the system can follow along either path 214c or 214b. If the system follows along path 214c (shown as a dotted line) to step 216, an alarm signal is transmitted preferably along with the stored images from the exit camera to the central monitoring site 118. However, in case the exiting person re-enters with a different descriptive feature, as is the case where a color distribution is used and the person exits with a jacket and re-enters without it, a further face recognition can be performed at step 220. At step 220, the stored image data, such as the faces of all of the people authorized to have access to the structure, are compared to the stored images from the entrance camera 104. At step 222, it is determined if there is a match. If there is no match the system proceeds along path 222b to step 216 where an alarm is triggered. If there is a match, the system proceeds along path 222a to step 300 where the detection of the exit is ignored or alternatively, along path 222c (shown as a dotted line) where the alarm signal and/or image data can also be transmitted to the central monitoring site as discussed above.

Those skilled in the art will recognize that the system illustrated in FIGS. 2 and 3 resolve the entry/exit conflicts described above. That is, a false alarm will not be triggered where an authorized person leaves and arms the alarm system but re-enters without disarming the alarm system or leaves while the alarm system is armed and returns.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A security monitoring system comprising;
   an exit and entrance camera located at the exit and entrance, respectively of a structure;
   a detector for detecting the exit or entry of an individual into or from the structure;
   an image recording system for storing images from the exit and entrance cameras; and
   a computer vision system for analyzing the stored images transmitted from the image recording system using a predetermined criteria to determine if the exiting and entering individuals are the same.

2. The security monitoring system of claim 1, wherein the detector is a door contact sensor located on an exit/entry door of the structure.

3. The security monitoring system of claim 1, wherein the detector is an infra-red sensor located near an exit/entry door of the structure.

4. The security monitoring system of claim 1, further comprising means for transmitting an alarm signal if the exiting and entering individual is determined not to be the same.

5. The security monitoring system of claim 1, further comprising means for transmitting at least a portion of the stored images to a remote site if the exiting and entering individual is determined not to be the same.

6. The security monitoring system of claim 1, wherein the predetermined criteria used to determine if the exiting and entering individuals are the same comprises matching descriptive features of the entering and exiting individual.

7. The security monitoring system of claim 6, wherein the descriptive feature is selected from a group consisting of one or more of a color, shape, or texture distribution of the stored images.

8. The security monitoring system of claim 1, further comprising:
   a database for storing image data for each authorized individual of the structure; and
   a recognition system for comparing the stored images from the entry and entrance camera with the stored image data in the database and for determining if the exiting and entering individual is one of the authorized individuals.

9. The security monitoring system of claim 8, wherein the stored image data in the database are face images and the recognition system is a face recognition system.

10. The security monitoring system of claim 8, further comprising means for transmitting an alarm signal if the exiting and entering individual is determined not to be the same and the exiting and entering individual is determined not to be one of the authorized individuals.

11. The security monitoring system of claim 8, further comprising means for transmitting at least a portion of the stored images to a remote site if the exiting and entering individual is determined not to be the same and the exiting and entering individual is determined not to be one of the authorized individuals.

12. The security monitoring system of claim 1, wherein the image recording system stores the images from the exit and entrance cameras upon the occurrence of an event.

13. The security monitoring system of claim 12, wherein the occurrence of an event is the triggering of the detector.

14. A method for performing security monitoring of a structure, the method comprising the steps of;
   capturing images at both an exit and entrance of the structure;
   before or after the capturing step, detecting the exit or entry of an individual into or from the structure;
   storing the captured images; and
   analyzing the stored images using a predetermined criteria to determine if the exiting and entering individuals are the same.

15. The method of claim 14, further comprising the step of transmitting an alarm signal if the exiting and entering individual is determined not to be the same.

16. The method of claim 14, further comprising the step of transmitting at least a portion of the stored images to a remote site if the exiting and entering individual is determined not to be the same.

17. The method of claim 14, further comprising the steps of:
   storing image data for each authorized individual of the structure; and
   comparing the stored images from the entry and entrance with the stored image data for determining if the exiting and entering individual is one of the authorized individuals.

18. The method of claim 17, further comprising the step of transmitting an alarm signal if the exiting and entering individual is determined not to be the same and the exiting and entering individual is determined not to be one of the authorized individuals.

19. The method of claim 17, further comprising the step of transmitting at least a portion of the stored images to a remote site if the exiting and entering individual is determined not to be the same and the exiting and entering individual is determined not to be one of the authorized individuals.

20. The method of claim 14, wherein the storing step stores the images from exit and entrance cameras upon the occurrence of an event.

* * * * *